United States Patent [11] 3,609,183

| [72] | Inventors | Horace A. DeWald; <br> Martin L. Black, both of Ann Arbor, Mich. |
|---|---|---|
| [21] | Appl. No. | 789,950 |
| [22] | Filed | Jan. 8, 1969 |
| [45] | Patented | Sept. 28, 1971 |
| [73] | Assignee | Parke Davis & Company <br> Detroit, Mich. |

[54] α-[p-(DIMETHYLAMINOALKYL)PHENYL]-4-METHOXY-α'-NITROSTILBENE COMPOUNDS
5 Claims, No Drawings

[52] U.S. Cl...................................................260/501.18,
260/343.7, 260/465 C, 260/501.15, 260/515 A,
260/567.6 M, 260/570 R, 260/570.8 R, 260/591,
260/592, 260/618 D, 260/650 R, 424/280,
424/329, 424/330
[51] Int. Cl........................................................ C07c 97/06
[50] Field of Search........................................... 260/570,
343.7, 501.1, 570 R, 501.18, 343.7

[56] References Cited
UNITED STATES PATENTS

| 2,914,561 | 11/1959 | Allen et al. | 260/570 |
| 2,971,001 | 2/1961 | Palopoli et al. | 260/570 X |
| 3,272,841 | 9/1966 | De Wald | 260/326.5 |

*Primary Examiner*—Robert V. Hines
*Attorneys*—Robert R. Adams, David B. Ehrlinger, George M. Richards and Edward J. Gall

ABSTRACT: α-{p-[4-(Dimethylamino)butyl]phenyl}-4-methoxy-α'-nitro-stilbene and α-{P-[5-(dimethylamino)pentyl]Phenyl}-4-methoxy-α'-nitrostilbene and acid-addition and quaternary ammonium salts thereof, useful as pharmacological agents that exhibit antiprogestational, hypocholesteremic, and antifertility activity; and their production by reacting a 1-[P-(dimethyl-aminoalkyl)phenyl]-1-( compound or a α-[p-(dimethylaminoalkyl)phenyl]g-4-methoxystilbene compound with nitric acid.

α-[p-(DIMETHYLAMINOALKYL)PHENYL]-4-METHOXY-α'-NITROSTILBENE COMPOUNDS

SUMMARY AND DETAILED DESCRIPTION

The present invention relates to new nitrostilbene compounds that are useful as pharmacological agents and to methods for their production. More particularly, the invention relates to a new α-4-methoxy-'-nitrostilbene compounds having in free base form the formula

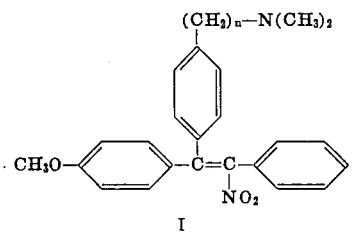

I and to pharmaceutically acceptable acid-addition and quaternary ammonium salts thereof; where n is 4 or 5.

In accordance with the invention, compounds having formula I above and their salts are produced by reacting a triarylethanol compound having the formula

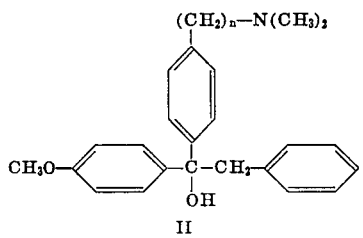

II or a triarylethylene compound having the formula

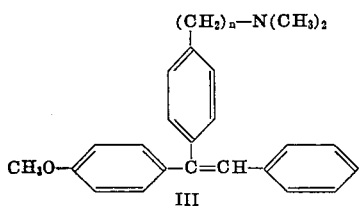

III with nitric acid; where n is as defined earlier. The reaction is advantageously carried out is an unreactive solvent medium. Some suitable solvents for this purpose are alkanoic acids, such as acetic acid and propionic acid, and halogenated hydrocarbons, such as carbon tetrachloride and tetrachloroethane. At least one and preferably up to 4 moles or more of nitric acid are used for each mole of the triarylethanol or triarylethylene compound. The concentration of the nitric acid and the time and temperature of the reaction are not espectially critical. In general, the reaction can be carried out at a temperature between about 20° and about 100° C. for a period that may vary from several minutes to several hours, with the shorter reaction times being used with the higher temperatures. The reaction is preferably carried out using fuming (90%) nitric acid (specific gravity, 1.5) at 20°–50° C. for a period of 30–60 minutes. The product of the reaction can be isolated directly as the nitric salt; following basification, as the free base; or following basification qnd subsequent slat formation, as an acid-addition or quaternary ammonium salt.

In the foregoing process, it is not critical whether the starting material selected for use is the triarylethanol compound of formula II or the triarylethylene compound of formula III, since the former can be converted into the latter by dehydration during the course of the reaction with nitric acid. For the same reason, a mixture of the two compounds can be used as a starting material with entirely satisfactory results. The triarylethanol compounds can be produced by the reaction of a benzophenone compound having the formula

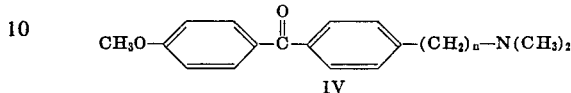

IV with benzyl magnesium chloride in an anhydrous ethereal solvent followed by hydrolysis of the reaction mixture with aqueous ammonium chloride; where n the same meaning as previously given. The triarylethanol compounds can be produced by dehydration of the triarylethanol compounds, for example, by heating with hydrogen chloride in ethanol or with 85% sulfuric acid for several hours at 70°–100° C. The triarylethylene compounds can also be obtained directly from the reaction of the benzophenone compound of formula IV and benzyl magnesium chloride by using a mineral acid for hydrolysis of the reaction mixture and employing a longer time or higher temperature during the hydrolysis. Because of the ease of dehydration, if it is desired to obtain the triarylethanol compound from this reaction, prolonged treatment with mineral acid should be avoided. In any particular case, the identity of the reaction product can be conveniently determined by examining the infrared absorption spectrum for absorption due to a hydroxyl group. Strong hydroxyl absorption indicates that the product is the triarylethanol compound, whereas absence of such absorption indicates that the dehydration has occurred and the product is the triarylethylene compound. Weak hydroxyl absorption indicates that a mixture of the two has been formed.

The benzophenone compounds having formula IV above are prepared by any of a variety of methods, which are illustrated in detail for the preparation of individual compounds in the examples that follow.

The free base compounds of the invention form acid-addition salts with a variety of inorganic and organic acids. Pharmaceutically acceptable acid-addition salts are formed with acids such as hydrochloric, hydrobromic, hydriodic, sulfuric, acetic, benzoic, citric, maleic, malic, gluconic, ascorbic, pamoic, and related acids. The acid-addition salts can be formed by the reaction of the free base with the selected acid by metathesis, by ion exchange, or by other salt-forming means. The free bases of the invention also form quaternary ammonium salts. Pharmaceutically acceptable quaternary ammonium salts are formed by reacting the selected free base with any of a number of salt forming agents such as methyl iodide, ethyl chloride, ethyl bromide, ethyl iodide, benzyl chloride, and methyl p-toluenesulfonate. The free base compounds and their salts are generally equivalent for the purposes of the invention except that one or the other may be preferred for particular solubility properties. Both the free bases and the salts of the invention can exist as cistrans isomers.

The compounds of the invention are new chemical compounds that are useful as pharmacological agents exhibiting antiprogestational, antifertility, and hypocholesteremic activity. Their antiprogestational effect is determined in a modified McPhail assay [see M. K. McPhail, J. Physiology (London), Vol, 83, 1934, page 145]by administering the test compound together with progesterone to each of a group of five rabbits and then measuring the reduction of endometrial proliferation in comparison with the endometrial proliferation observed in a group of five control animals receiving only progesterone. In this test, the administration of 10 mg. of α-{-[4-(dimethylamino)butyl]phenyl}-4-methoxy-α'-nitrolstilbene monocitrate concomitantly with 1.6 mg. of progesterone brought about a 70–80 percent reduction of endometrial proliferation in this species of test animal. (On the McPhail index, the controls were rated at a mean value of 3.6, and the test animals were rated at a mean value of 0.8)

By virtue of their antiprogestational activity, the compounds of the invention have been found to be effective antifertility agents when administered *post-coitally* to rats. In this test, adult female rats are exposed overnight to tested fertile male rats, and then of the following morning, vaginal smears are examined for the presence of male sperm. If the smears are found positive, each female is treated orally on that day with a given dose of the test compound and again once each day for six additional days. On the eighth day, the females are sacrificed, and the uterus of each is examined for implanation sites and gross abnormalities. When tested by this method, α-{p-[4-(dimethylamino)butyl]phenyl}-4-methoxy-α'-nitrostilbene monocitrate and α-{p-[-(5-dimethyl-amino)pentyl]phenyl}-4-methoxy-α'-nitrostilbene monocitrate were found to be completely effective in inhibiting pregnancy when each was administered at a dose level of 25 micrograms/kg. by stomach tube in aqueous solution.

As hypocholesteremic agents, the compounds of the invention cause a decrease on the level of blood cholesterol in standard experimentation animals. This activity is determined in rats weighing 200–250 g. by administering the test compound by daily intubation for one week at a given dose level and then comparing the average plasma cholesterol level of the treated animals with that of control animals. In this test, α- p-[4-(dimethylamino)butyl]phenyl}-4-methoxy-α'-nitrostilbene monocitrate when administered at a dose level of 25 mg. of free base equivalent was found to effect a 44 percent lowering of the cholesterol level, and α-{p-[-5-(dimethylamino)pentyl]phenyl}-4-methoxy-α'-nitrostilbene monocitrate when administered at the same dose level effected a 47 percent lowering of the cholesterol level.

The invention is illustrated by the following examples.

EXAMPLE 1

With stirring, 3.2 g. of fuming (90%) nitric acid (specific gravity, 1.5) is added dropwise to a solution of 8.0 g. of 1- p-[4-(dimethylamino)butyl]phenyl} -1-(p-methoxyphenyl)-2-phenylethanol in 40 ml. of glacial acetic acid. During the addition, the temperature of the reaction mixture rises to approximately 48° C. After 45 minutes, the mixture is concentrated to about one-third its original volume. The concentrate is 100 with 100ml. of cold water, and the aqueous mixture is made basic to pH 9–10 with 50 percent aqueous sodium hydroxide. The orange summy solid that precipitates is extracted into benzene, and the benzene solution is washed with water, dried, and concentrated under reduced pressure to give α-{p-{4-(dimethylamino)butyl]phenyl}-4methoxy-α'-nitrostilbene, obtained as an orange oil that is a mixture of isomers. A solution of 8.0 g. of this oily product is 25 ml. of hot 2-butanone is added to a hot solution of 3.7 g. of anhydrous citric acid in 45 ml. of 2-butanone, and upon cooling with scratching, there is obtained a yellow crystalline precipitate of α-{p-[4-(dimethylamino)butyl]phenyl}-4-methoxy-α'-nitrostilbene monocitrate, a mixture of isomers, which is filtered, washed successively with cold acetone, cold ethyl acetate, and cold ether, and dried under reduced pressure at room temperature; m.p. 100°35 g.) C. (with decomposition). Fractional 80 ml. this mixture of isomeric slats from acetonitrile gives a low-melting isomer 40 percent 96°–100° C. (following recrystallization of the separated salt from acetonitrile) and a high-melting isomer monocitrate, m.p. 113°–115°–C. (also C. from acetonitrile).

The acetate salt of α-{p-[4-(dimethylamino)butyl]phenyl - 4-methoxy-α'-nitrostilbene is obtained by dissolving 3 g. of the free base in 25 ml. of acetic acid and evaporating the solution to dryness under reduced pressure. The sulfate salt is obtained by dissolving 4.3 g. of the free base in 100 ml. of 0.1 N sulfuric acid and then freezing and lyophilizing the solution.

The methiodide salt is obtained by treating a cooled solution of 5 g. of the free base in 50 ml. of acetonitrile with 7.5 ml. of methyl iodide, allowing the mixture to stand over night and then pouring it into 500 ml. of ether and collecting the insoluble product.

The starting material that is used in the procedure of this example is obtained as described in the following.

To a mixture consisting of 1,305 g. of 70 percent calcium hypochlorite, 930 g. of potassium carbonate, 264 g. of potassium hydroxide, and 5,200 ml. of water at 65° C. is added 541 g. of p-(4-chlorobutyl)acetophenone is such a manner that the reaction temperature is maintained at about 65° C. After the exothermic reaction subsides, the mixture is cooled to 40° C., and 250 g. of sodium bisulfite is added. The resulting mixture is then washed with ether, and the aqueous phase is separated and acidified with 550 ml. of concentrated hydrochloric acid. The p-(4-chlorobutyl)benzoic acid that precipitates is isolated, dried, and crystallized from aqueous ethanol; m.p. 114°–116° C.

To a mixture of 216 g. of anisole and 3,600 g. of polyphosphoric acid at 60° C. is carefully added 432 g. of p-(4-chlorobutyl)benzoic acid. During the addition, the temperature of the reaction mixture rises to about 75° C. When the exothermic reaction subsides and the temperature begins to drop, the mixture is poured into 16 liters of water. The resulting aqueous mixture is thoroughly extracted with ether, and the ether extract is first washed successively with 500 ml. of 1 N sodium hydroxide, 500 ml. of water, and 500 ml. of aqueous sodium chloride, then dried, and evaporated to give p-(4-chlorobutyl)-p'-methoxybenzophenone, suitable for use in the next reaction without additional purification.

A mixture consisting of 500 g. of p-(4-chlorobutyl)-p'-methoxybenzophenone, 500 g. of dimethylamine, 10 g. of potassium iodide, and 2,000 ml. of isopropyl alcohol is heated at 100° C. for 8 hours in a sealed pressure vessel, then cooled, filtered, and concentrated to remove the solvent. To the residue is added 2,130 ml. of 0.7N hydrochloric acid, and the acidic solution is heated on a steam bath for a short period, cooled, treated with charcoal, and filtered. The filtrate is made basic with excess 50 aqueous sodium hydroxide, and the basic mixture is extracted with two 2,000-ml. portions of water. The water extracts are combined, washed with two 500-ml. portions of water and with one 500-ml. portion of aqueous sodium chloride, dried, and evaporated to give {-]4-(dimethylamino)butyl]-['-methoxybenzophenone, suitable for use in the following reaction step without further purification.

To a stirred ethereal solution of benzyl magnesium chloride (prepared from 2.4 g. of magnesium, 12.5 g. of benzyl chloride, and 100 ml. of ether) is added dropwise a solution of 10 g. of p-[4-(dimethylamino)butyl]-p'-methoxybenzophenone in 60 ml. of anhydrous tetrahydrofuran, and the resulting mixture is heated under reflux for 2 hours, cooled, and carefully treated with 75 ml. of saturated aqueous ammonium chloride. The organic phase is separated, washed with water, and extracted with 100 ml. of cold 1 N aqueous hydrochloric acid. The acidic solution is immediately made basic with excess aqueous sodium hydroxide, and the basic mixture is extracted several times with ether. The ether extracts are combined dried, and evaporated to give the desired 1-{p-[4-(dimethylamino)butyl]phenyl}-1(p-methoxyphenyl-2-phenylethanol starting material; m.p. 95°–98° C., following crystallization from diethyl ether-petroleum ether.

EXAMPLE 2

With stirring, 3.0 g. of fuming (90 percent) ) nitric acid (specific gravity, 1.5) is added dropwise to a solution of 8.2 g. of 1{ p-[5-(dimethylamino)pentyl}-1-(p-methoxyphenyl)-2-phenylethanol in 30 ml. of glacial acetic acid. After one hour, the resulting solution is evaporated under reduced pressure, and the residue obtained is diluted with 100 ml. of cold water. The aqueous mixture is made basic to pH 9-10with 50 percent aqueous sodium hydroxide, and the precipitate that is obtained is extracted into benzene. The benzene solution is washed with water, dried, and concentrated under reduced pressure to give α- p-[5-(dimethylamino)pentyl]phenyl -4-methyoxy-α'-nitrostilbene, obtained as an oil that is a mixture of isomers. A solution of 8.0 g. of this oily product in 25 ml. of hot 2-butanone is added to a hot solution of 3.7 g. of anhydrous citric acid in 45 ml. of 2-butanone, and upon cooling there is obtained a solid precipitate of α- p-[-(dimethylamino)-pentyl]phenyl -4-methoxy-α'-nitrostilbene monocitrate, a mixture of isomers, which is filtered, washed successively with cold acetone, cold ethyl acetate, and cold ether, and dried under reduced pressure at room temperature; m.p. 93°–95° C.

The hydrochloride salt of α-{ p-[5-(dimethylamino)pentyl[-phenyl} -4-methoxy-α'-nitrostilbene is obtained by treating an ethereal solution of the free base oil with excess anhydrous hydrogen chloride and isolating and drying the precipitated solid salt. A salt with pamoic acid, 4,4'-methylenebis(3-hydroxy-2-naphthoic acid), is obtained by mixing aqueous solution of equivalent amounts of the hydrochloride and sodium pamoate and collecting the insoluble product.

The starting material is obtained as follows.

To a stirred mixture consisting of 20 g. of potassium cyanide, 2 ml. of benzyl trimethylammonium hydroxide 60 ml. of water, and 150 ml. of 95 percent ethanol, heated under reflux, is carefully added 60 g. of 4-(p-bromophenyl)butyl bromide, and the resulting mixture is heated under reflux for 6 hours and evaporated under reduced pressure. The residue is diluted with water, and the aqueous mixture is extracted with ether. The ether extract is dried and evaporated to dryness, and the residue is distilled under reduced pressure to give 5-(p-bromophenyl)valeronitrile; b.p. 180°–183° C./8 mm. Hg.

A solution of 39 g. of 5-(p-bromophenyl)valeronitrile in 50 ml. of glacial acetic acid is added to a mixture of 60 ml. of concentrated sulfuric acid and 60 ml. of water, and the resulting mixture is heated under reflux for 3 hours and then poured into ice water. The solid precipitate of 5-(p-bromophenyl)valeric acid that is obtained is isolated, washed with water, and dried; m.p. 88°–91° C.

To a stirred suspension of 12 g. of sodium borohydride in 300 ml. of tetrahydrofuran at 10° C. is added first a solution of 38 g. of 5-(p-bromophenyl)valeric acid in 70 ml. of tetrahydrofuran and then 43 g. of boron trifluoride etherate. The resulting suspension is stirred at room temperature for 12–18 hours and is then treated with sufficient acetone to decompose any excess sodium borohydride. Water (400 ml.) is added, and the aqueous mixture is acidified with concentrated hydrochloric acid and saturated with sodium chloride. The acidified mixture is extracted with ether, and the ether extract is washed with 1 N sodium hydroxide, dried, and evaporated to dryness to give 5-(p-bromophenyl)pentanol, obtained as an oil that is suitable for use in the following reaction without further purification.

The foregoing intermediate product (35g. ) is added to a mixture of 80ml. of concentrated sulfuric acid and 30 ml. of 40% hydrobromic acid, and to the resulting mixture is added dropwise 5.5 ml. of concentrated sulfuric acid. The mixture is then stirred and heated at 120°–130°C. For one hour, cooled, and poured into ice water. The aqueous mixture obtained is extracted with ether, and the ether extract is dried and concentrated under reduced pressure to give a residue of 1-bromo-5-(p-bromophenyl)pentane, which is purified by distillation under reduced pressure; b.p. 169°–172° C./8 mm. Hg.

A solution of 20 g. of 1-bromo-5-(p-bromophenyl)pentane in 200 ml. of isopropyl alcohol saturated with dimethylamine is heated under reflux for 90 minutes while anhydrous dimethylamine is continually bubbled through the solution. The resulting mixture is then stirred and heated under reflux for 12–18 hours and concentrated, and the residue obtained is diluted with water. The aqueous mixture is washed with ether and then made strongly basic with sodium hydroxide. The basic solution is extracted with ether, and the ether extract is dried and evaporated to give a residue of 5-(p-bromophenyl)-1-(dimethylamino)pentane, which is purified by distillation under reduced pressure; b.p. 161°–163° C./8 mm. Hg.

A mixture consisting of 14 g. of the foregoing intermediate product, 1.2 g. of magnesium, and 70 ml. of tetrahydrofuran is heated under reflux until reaction is complete, and to the resulting mixture is added a solution of 10 g. of p-methoxybenzonitrile in 70 ml. of ether. The reaction mixture is heated under reflux for 12–18 hours, cooled, diluted with 100 ml. of ether, and then carefully treated with 100 ml. of saturated aqueous ammonium chloride. The organic phase is separated, washed with water, and extracted with 150 ml. of 1 N hydrochloric acid. The acidic extract is heated on a steam bath for 15 minutes and then made strongly basic with concentrated aqueous sodium hydroxide. The basic mixture is extracted with ether, and the ether extract is dried and evaporated to give p-[5-(dimethylamino)pentyl]-p'-methoxybenzophenone, which is purified by distillation under reduced pressure; b.p. 197–200° C./0.2 mm. Hg.

To a stirred ethereal solution of benzyl magnesium chloride (prepared from 2.4 g. of magnesium, 12.5 g. of benzyl chloride, and 100 ml. of ether) is added dropwise a solution of 10 g. of p-[5-(dimethylamino)pentyl]-p'-methoxybenzophenone in 60 ml. of anhydrous tetrahydrofuran, and the resulting mixture is heated under reflux for 2 hours, cooled, and carefully treated with 75 ml. of saturated aqueous ammonium chloride. The organic phase is separated, washed with water, and extracted with cold 1 N aqueous hydrochloric acid. The acidic solution is immediately made basic with excess sodium hydroxide, and the basic mixture is extracted well with ether. The ether extract is dried and evaporated to give the desired 1-{p-[5-(dimethylamino)pentyl]phenyl -1-(p-methoxyphenyl)-2-phenylethanol starting material; m.p. 88°–91 C.

We claim:
1. A member of the class consisting of α-[p-(dimethylaminoalkyl)phenyl]4-methoxy-α'-nitrostilbene compounds having in free base form the formula

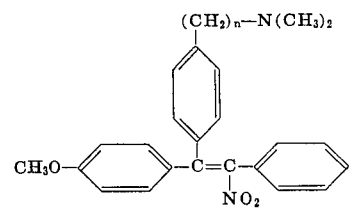

and pharmaceutically acceptable acid-addition salts thereof; where n is a positive integer selected from between 4 and 5.

2. A compound according to claim 1 which is a α- p-{4-(dimethylamino)butyl]phenyl} -4-methoxy-α'-nitrostilbene.

3. A compound according to claim 1 which is α-,p-Y4-(dimethylamino)butyl]phenyl} -4-methoxy-α'-nitrostilbene monocitrate.

4. A compound according to claim 1 which is α-{p-[5-(dimethylamino)pentyl]henyl} 4-methoxy-α'-nitrostilbene.

5. A compound according to claim 1 which is α-}p-[5-(dimethylamino)pentyl]henyl} -4-methoxy-α'-nitrostilbene monocitrate.